(12) United States Patent
Gu et al.

(10) Patent No.: US 11,031,648 B2
(45) Date of Patent: Jun. 8, 2021

(54) BATTERY PACK

(71) Applicant: Samsung SDI Co., Ltd., Yongin-si (KR)

(72) Inventors: Eungyeong Gu, Yongin-si (KR); Kyungho Cho, Yongin-si (KR); Junyoung Kim, Yongin-si (KR); Seung woo Yang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/200,532

(22) Filed: Nov. 26, 2018

(65) Prior Publication Data

US 2019/0181403 A1    Jun. 13, 2019

(30) Foreign Application Priority Data

Dec. 11, 2017    (KR) .................. 10-2017-0169535

(51) Int. Cl.
*H01M 50/20* (2021.01)
*H01M 10/04* (2006.01)
*H01M 50/30* (2021.01)

(52) U.S. Cl.
CPC ....... *H01M 50/20* (2021.01); *H01M 10/0481* (2013.01); *H01M 10/0486* (2013.01); *H01M 50/30* (2021.01); *H01M 2220/20* (2013.01)

(58) Field of Classification Search
CPC .. H01M 2/1077; H01M 2/12; H01M 10/0481; H01M 10/0486; H01M 2220/20; H01M 2/1252; H01M 2/1016
See application file for complete search history.

(56) References Cited

U.S. PATENT DOCUMENTS 9,537,125 B2    1/2017 Park et al.
9,553,289 B2    1/2017 Lee et al.
(Continued)

FOREIGN PATENT DOCUMENTS

CN    106299187 A    1/2017
EP    2 819 210 A1    12/2014
(Continued)

OTHER PUBLICATIONS

Extended European Search Report for corresponding European Patent Application No. 18211178.1, dated Mar. 20, 2019, 9 pages.
(Continued)

*Primary Examiner* — Haroon S. Sheikh
*Assistant Examiner* — Patrick Marshall Greene
(74) *Attorney, Agent, or Firm* — Lewis Roca Rothgerber Christie LLP

(57) ABSTRACT

A battery pack includes: a plurality of battery cells; a first end plate on an outer side of a first battery cell of the plurality of battery cells that is arranged at an outermost side of the plurality of battery cells; and a first end block between the first end plate and the first battery cell, the first end block includes: a frame portion on an inner side of the first end block and facing the first battery cell, the frame portion surrounding edge portions of the first battery cell; and an end portion on an outer side which is a side opposite to that of the first battery cell, the end portion surrounding a bushing member, and the bushing member includes: fixing portions surrounded by the end portion; and an exposed portion exposed from the end portion to define a welded portion with the first end plate.

19 Claims, 7 Drawing Sheets

(56) References Cited

U.S. PATENT DOCUMENTS

| | | | |
|---|---|---|---|
| 9,660,230 B2 | 5/2017 | Noh | |
| 9,748,539 B2 | 8/2017 | Kim et al. | |
| 2013/0183571 A1 | 7/2013 | Miyazaki et al. | |
| 2014/0349164 A1* | 11/2014 | Park | H01M 2/305 |
| | | | 429/121 |
| 2015/0004469 A1* | 1/2015 | Park | H01M 2/1077 |
| | | | 429/151 |
| 2015/0030894 A1* | 1/2015 | Lee | H01M 2/1252 |
| | | | 429/72 |
| 2017/0141367 A1 | 5/2017 | Kim et al. | |
| 2018/0090729 A1* | 3/2018 | Cao | H01M 2/1077 |
| 2018/0159096 A1 | 6/2018 | Kim et al. | |
| 2018/0166660 A1* | 6/2018 | Kim | H01M 10/42 |

FOREIGN PATENT DOCUMENTS

| | | |
|---|---|---|
| KR | 10-2015-0001604 A | 1/2015 |
| KR | 10-2015-0010226 A | 1/2015 |
| KR | 10-2015-0013013 A | 2/2015 |
| KR | 10-2015-0057261 A | 5/2015 |
| KR | 10-2017-0053429 A | 5/2017 |
| KR | 10-2017-0054878 A | 5/2017 |
| KR | 10-2017-0056973 A | 5/2017 |

OTHER PUBLICATIONS

Korean Office Action dated Oct. 18, 2019, for corresponding Korean Patent Application No. 10-2017-0169535 (62 pages).
Korean Notice of Allowance dated Feb. 28, 2020, for corresponding Korean Patent Application No. 10-2017-0169535 (6 pages).

* cited by examiner

BATTERY PACK

CROSS-REFERENCE TO RELATED APPLICATION

This application claims priority to and the benefit of Korean Patent Application No. 10-2017-0169535, filed on Dec. 11, 2017 in the Korean Intellectual Property Office, the entire disclosure of which is incorporated herein by reference.

BACKGROUND

1. Field

Aspects of one or more embodiments relate to a battery pack.

2. Description of the Related Art

In general, secondary batteries are chargeable and dischargeable, unlike non-rechargeable primary batteries. Secondary batteries are used as energy sources, such as for mobile devices, electric vehicles, hybrid vehicles, electric bicycles, and uninterruptible power supplies, and may be used in the form of a single battery cell or a battery pack in which a plurality of batteries cells are connected together, according to a type of an external device to which the secondary battery is applied.

Small mobile devices, such as mobile phones, may operate for a predetermined time with the power output and capacity of a single battery. However, when long-time or high-power driving is required, such as with a power-consuming electric vehicle or hybrid vehicle, a battery pack may be preferred due to a requirement for high power or capacity. The output voltage or output current of the battery pack may be increased according to the number of battery cells installed in the battery pack.

SUMMARY

According to an aspect of one or more embodiments, a battery pack may be manufactured at a reduced cost, with a reduced number of parts, and through fewer assembly processes.

Additional aspects will be set forth, in part, in the description which follows and, in part, will be apparent from the description, or may be learned by practice of the presented embodiments.

According to one or more embodiments, a battery pack includes: a plurality of battery cells; a first end plate on an outer side of a first battery cell of the plurality of battery cells that is arranged at an outermost side of the plurality of battery cells; and a first end block between the first end plate and the first battery cell, wherein the first end block includes: a frame portion on an inner side of the first end block and facing the first battery cell, the frame portion surrounding edge portions of the first battery cell; and an end portion on an outer side which is a side opposite to that of the first battery cell, the end portion surrounding a bushing member, and wherein the bushing member includes: fixing portions surrounded by the end portion; and an exposed portion exposed from the end portion and defining a welded portion with the first end plate.

In one or more embodiments, the battery pack may further include a plurality of frames that are coupled to and face each other with battery cells of the plurality of battery cells alternately arranged therebetween, and a first frame of the plurality of frames arranged at an outermost side of the plurality of frames may be coupled to and face the frame portion with the first battery cell therebetween.

In one or more embodiments, the frame portion may surround an outer surface among main surfaces of the first battery cell and edge portions of the first battery cell that contact the outer surface, and the first frame may surround an inner surface among the main surfaces of the first battery cell and edge portions of the first battery cell that contact the inner surface.

In one or more embodiments, the first battery cell may include a cell vent on an upper surface thereof, the frame portion may include a guide wall at a position corresponding to the cell vent, and the first frame may include a guide rib at a position corresponding to the cell vent.

In one or more embodiments, when the frame portion and the first frame are coupled to each other with the first battery cell therebetween, the guide wall of the frame portion and the guide rib of the first frame may be connected to each other to provide an exhaust path completely surrounding the cell vent of the first battery cell.

In one or more embodiments, the first end block may be integrally formed.

In one or more embodiments, the first end block may include a plastic material, and the bushing member may include a metal material.

In one or more embodiments, the bushing member may be integrally formed together with the first end block by insert injection molding.

In one or more embodiments, the bushing member may include a pair of bushing members at opposite sides of the end portion.

In one or more embodiments, the bushing member may include a hollow cylindrical member configured to receive a fastening member thereinto.

In one or more embodiments, the fixing portions may be at opposite ends of the bushing member along a lengthwise direction of the bushing member, and the exposed portion may be at a central position between the opposite ends of the bushing member.

In one or more embodiments, the exposed portion of the bushing member may be exposed from the end portion and face the first end plate.

In one or more embodiments, the end portion may include an output port seat configured to receive an output terminal of the battery pack thereinto.

In one or more embodiments, the output port seat includes a metal material.

In one or more embodiments, the bushing member and the output port seat may include a pair of bushing members and a pair of output port seats, respectively, and the pair of bushing members may be located outside of the pair of output port seats.

In one or more embodiments, the bushing member may have a height different from a height of the output port seat along a lengthwise direction in which the bushing member extends.

In one or more embodiments, an uppermost portion of the bushing member along the lengthwise direction may be below an uppermost portion of the output port seat.

In one or more embodiments, the end portion may include a plurality of reinforcing ribs.

In one or more embodiments, the first end plate may include: a base portion; and bent side portions on both side edges of the base portion, the bent side portions surrounding the bushing member and defining welded portions with the bushing member.

In one or more embodiments, battery cells of the plurality of battery cells may be arranged along a direction, the first end plate may be arranged on an outer side of the first battery cell in the direction, and side plates may be arranged along side edges of the battery cells in a direction intersecting the direction in which the battery cells are arranged.

In one or more embodiments, the side plates and the first end plate may be welded to the bushing member.

BRIEF DESCRIPTION OF THE DRAWINGS

These and/or other aspects will become apparent and more readily appreciated from the following description of some embodiments, taken in conjunction with the accompanying drawings in which.

DETAILED DESCRIPTION

Figure 1:
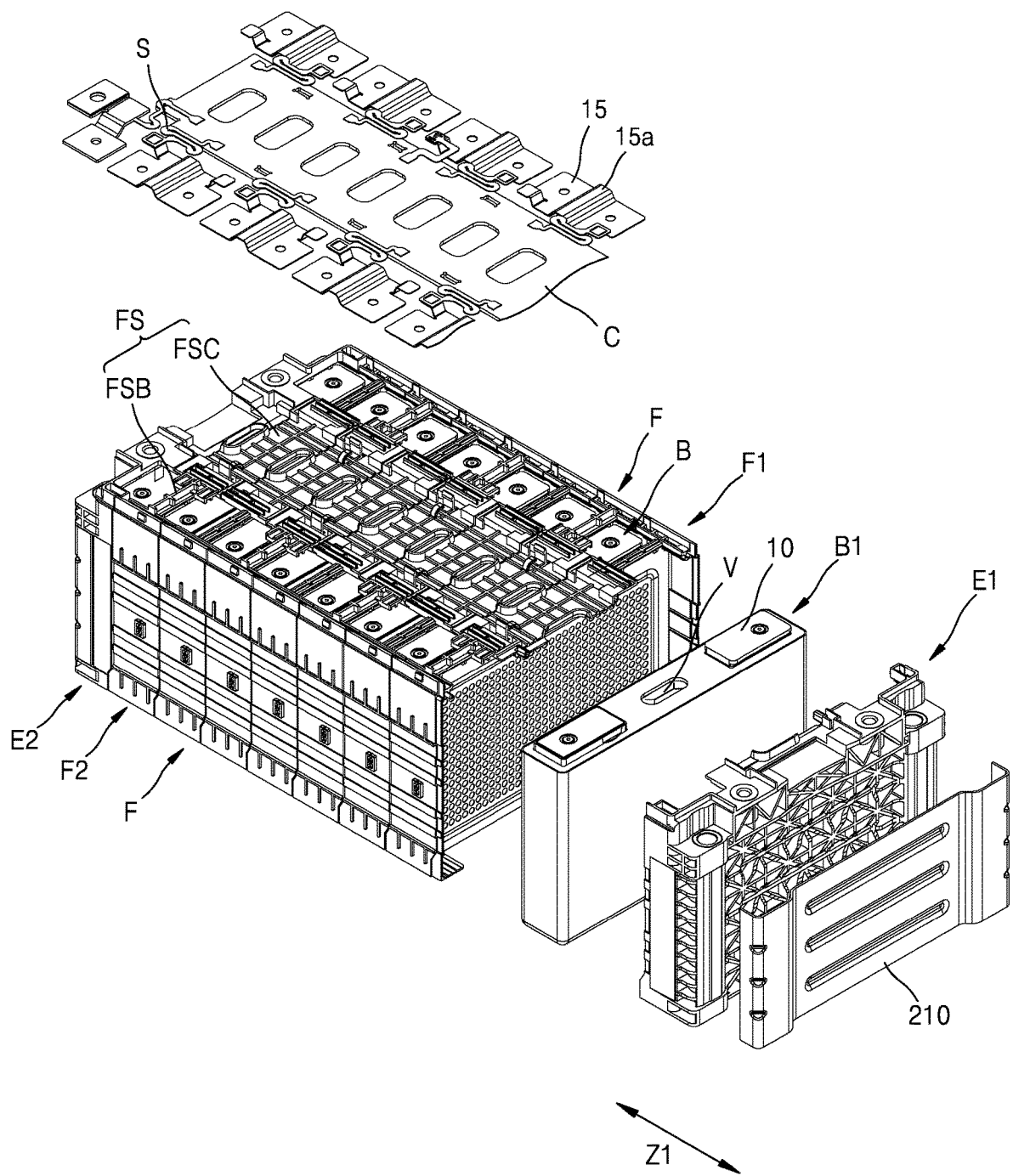
FIG. 1 is an exploded perspective view of a battery pack according to an embodiment.

Reference will now be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Herein, some embodiments of a battery pack according to the inventive concept will be described with reference to the accompanying drawings.

Figure 2:
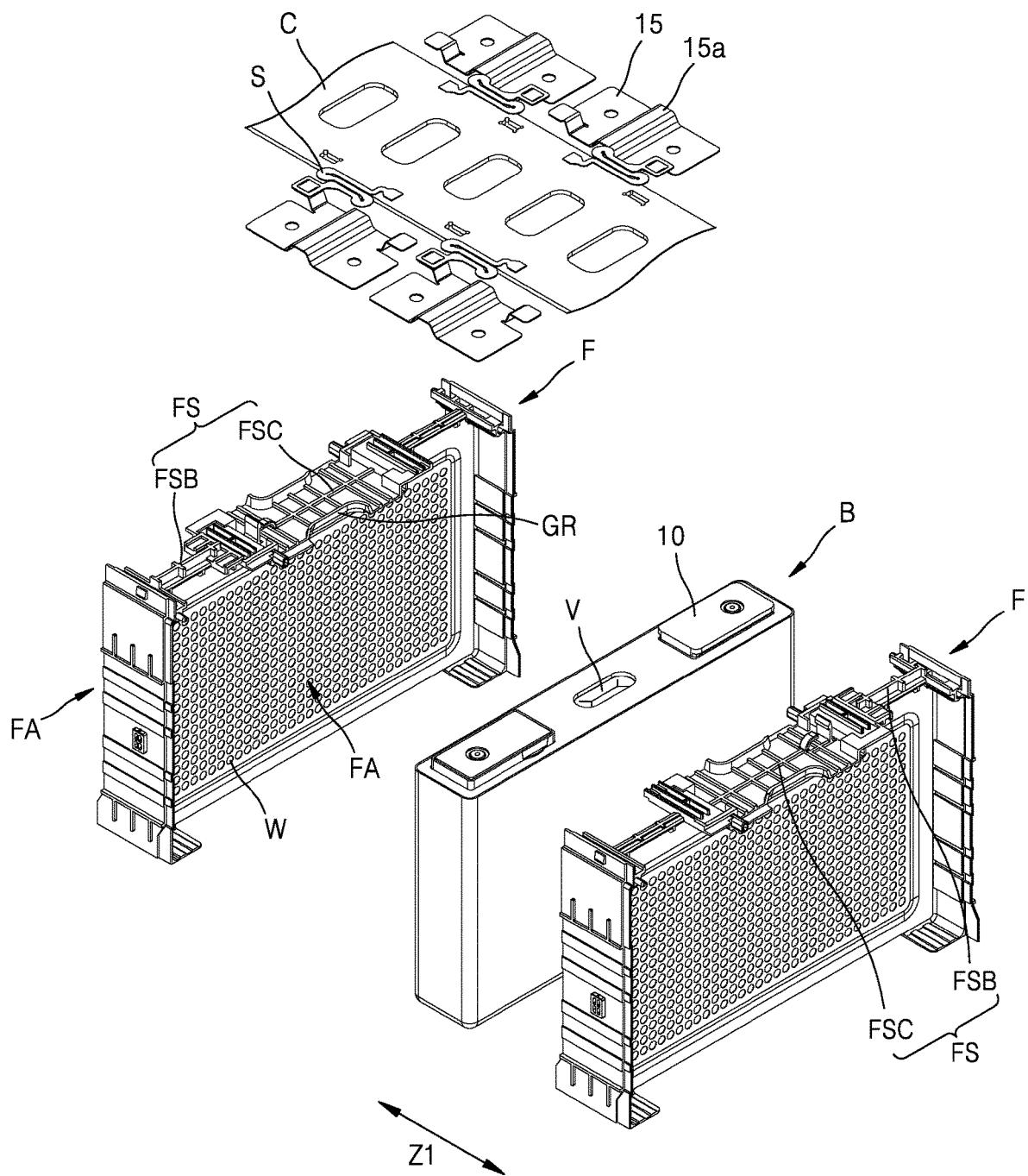
FIG. 2 is a partial exploded perspective view of the battery pack of FIG. 1.

FIG. 1 is an exploded perspective view of a battery pack according to an embodiment; FIG. 2 is a partial exploded perspective view of the battery pack of FIG. 1; and FIG. 3 is a top view of the battery pack of FIG. 1.

Figure 3:
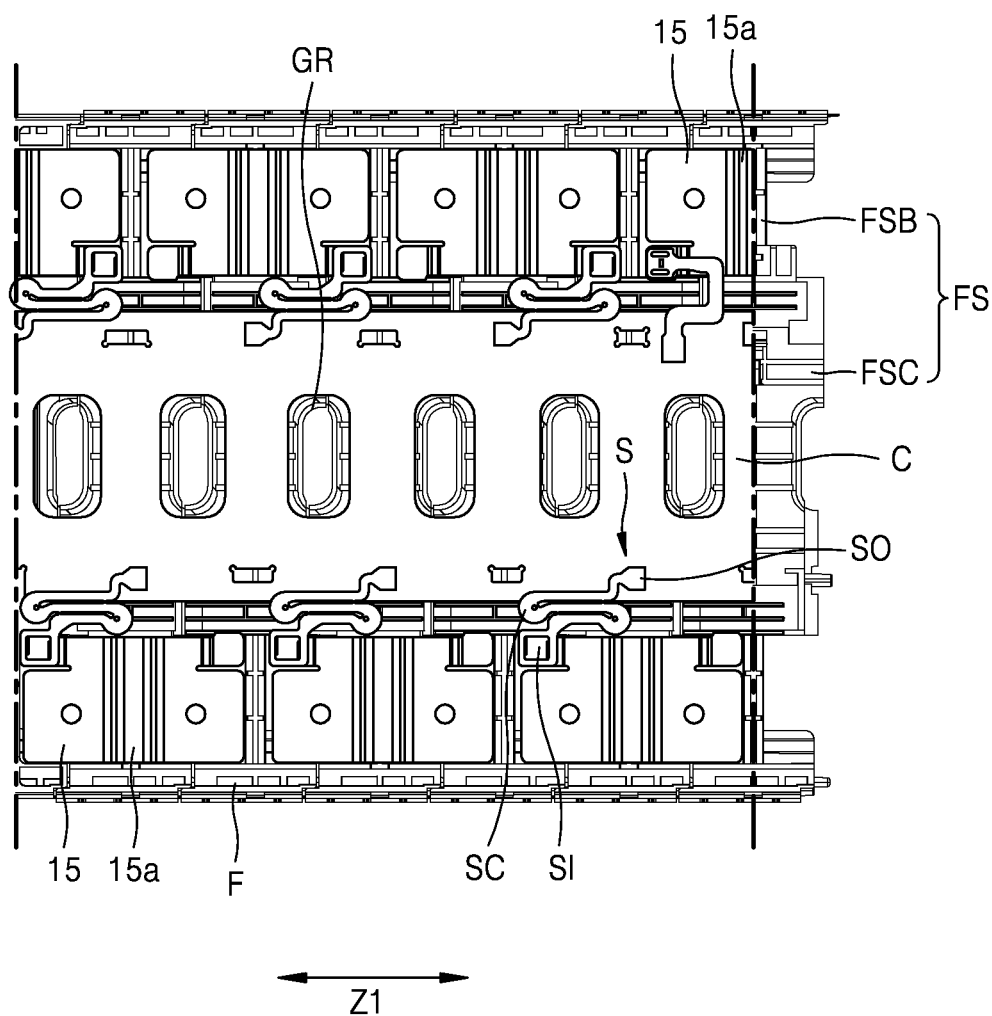
FIG. 3 is a top view of the battery pack of FIG. 1.

Referring to FIGS. 1, 2, and 3, a battery pack according to one or more embodiments may include a plurality of battery cells (B) arranged along a direction (Z1 direction), and a plurality of frames (F) arranged in the direction (Z1 direction) together with the battery cells (B), wherein the frames (F) may be arranged alternately with the battery cells (B) in the direction (Z1 direction) and connected to each other. In an embodiment, for example, the frames (F) may be arranged in the direction (Z1 direction) alternately with the battery cells (B), wherein adjacent frames (F) may be connected together facing each other with one battery cell (B) interposed therebetween.

The frames (F) may surround an outer periphery of the battery cell (B) to accommodate the battery cell (B), forming an accommodating portion (FA) while extending along the outer periphery of the battery cell (B) to receive the battery cell (B) therein. In an embodiment, the frames (F) may extend along the outer periphery of the battery cell (B) across upper, lower, left, and right side portions of the battery cell (B). The frames (F) may include the accommodating portion (FA), which is an inner portion of the frame (F) for accommodating the battery cell (B) inside the frame (F), and a support portion (FS), which is an outer portion of the frame (F) for supporting objects that may be electrically connected to the battery cell (B), such as, for example, a bus bar 15 and a wiring substrate (C). For example, the support portion (FS) may be formed in a portion of the frame (F) extending over the upper side portion of the battery cell (B) in which an electrode 10 is disposed. The frames (F) may surround the battery cells (B) inside the frames (F) and may form the support portions (FS) to provide an external base for supporting objects that are to be electrically connected with the battery cell (B), such as, for example, the bus bar 15 and the wiring substrate (C).

In an embodiment, the frames (F) may be arranged in the direction (Z1 direction) with a battery cell (B) interposed between every two adjacent frames (F), wherein the adjacent frames (F) may be connected together facing each other. In other words, each battery cell (B) may be surrounded by the adjacent frames (F) that are arranged at front and rear of the battery cell (B) in the direction (Z1 direction), wherein the adjacent frames (F) arranged at front and rear of each of the battery cells (B) may surround the outer periphery of the battery cell (B) to form an externality covering the battery cell (B) as a housing protecting the battery cell (B). In the entire battery pack including the plurality of battery cells (B), an array of the frames (F) that are arranged in the direction (Z1 direction) may substantially form an externality of the battery pack, wherein the battery cells (B) may be accommodated inside the array of the frames (F) by being surrounded by the frames (F).

The frames (F) may be arranged in the direction (Z1 direction) alternately with the battery cells (B), wherein each of the frames (F) may include accommodating portions (FA) that may accommodate different battery cells (B) adjacent to the frame (F), respectively. For example, each frame (F) may include the accommodating portions (FA) arranged in the direction (Z1 direction) at front and rear of the frame (F), respectively. The accommodating portions (FA) may be separated from one another by a partition wall (W). The partition wall (W) of the frame (F) may partition the accommodating portions (FA) from one another and may block electrical and thermal interference between the different battery cells (B) received in the accommodating portions (FA).

For electrical connection with adjacent other battery cells (B), the battery cells (B) may be connected to the bus bars 15. To acquire status information of the battery cells (B), such as voltages or temperatures of the battery cells (B), and collect the status information of the battery cells (B), the battery cells (B) may be connected to the wiring substrate (C). For example, the bus bars 15 and the wiring substrate (C) may be components that form electrical connections with the battery cells (B). These components may be supported on the support portions (FS) of the frames (F).

In an embodiment, the support portion (FS) of each frame (F) may include a bus bar support portion (FSB) on which the bus bar 15 may be supported, and a substrate support portion (FSC) on which the wiring substrate (C) may be mounted and supported. The bus bar support portion (FSB) and the substrate support portion (FSC) may be formed at different positions of the support portion (FS). For example, the bus bar support portion (FSB) may be formed at a left edge or right edge position of the frame (F) such as to correspond to the electrode 10 of the battery cell (B), and the substrate support portion (FSC) may be formed at a central position of the frame (F). In an embodiment, the wiring substrate (C) supported on the substrate support portions (FSC) of the frames (F) may be located at central positions of the plurality of battery cells (B) to easily collect status information of the battery cells (B) from the different sites of the plurality of battery cells (B). The wiring substrate (C) may be connected to sensing portions (S) to acquire status information from the battery cells (B). In an embodiment, the wiring substrate (C) may be located across the central positions of the battery cells (B), such that distances from the wiring substrate (C) to the sensing portions (S) connected to a plurality of sites of the plurality of battery cells (B) may be equal or substantially equal, and electrical resistances of the sensing portions (S) connected to the plurality of sites may be balanced to prevent or substantially prevent a signal distortion.

The bus bar support portion (FSB) and the substrate support portion (FSC) may have different widths. For example, the bus bar support portion (FSB) may have a relatively small width such as not to interrupt electrical connection between the bus bar 15 and the battery cell (B), and, in particular, the electrode 10 of the battery cell (B). The bus bar support portion (FSB) may support front and rear end portions of the bus bars 15, each bus bar 15 having opposite front and rear end portions with respect to a bent portion 15a located at a center portion thereof, and may insulate the adjacent bus bars 15 from one another. The bus bar support portion (FSB) may support the opposite front and rear end portions of the adjacent bus bars 15, and may electrically insulate the adjacent bus bars 15 from one another to prevent or substantially prevent contacting of the opposite end portions of the bus bars 15 to end portions of other adjacent bus bars 15. The bus bar support portion (FSB) may need not physically contact the opposite end portions of the adjacent bus bars 15, as long as it is disposed between the adjacent bus bars 15 such as to provide electrical insulation between the adjacent bus bars 15. The bus bar support portion (FSB) may have a relatively small width such as not to narrow a current carrying area between the bus bar 15 and the electrode 10 of the battery cell (B), as long as it is interposed between the adjacent bus bars 15 to prevent or substantially prevent electrical contact between the adjacent bus bars 15. If the bus bar support portion (FSB) has a width as large as the substrate support portion (FSC), the bus bar support portion (FSB) may hinder electrical contact between the bus bar 15 and the battery cell (B), and, in particular, the electrode 10 of the battery cell (B), and may restrict the current carrying area between the bus bar 15 and the battery cell (B) to be narrow, such that the entire electrical resistance of charge and discharge paths may be increased, and the electrical output may be lowered.

In an embodiment, the bus bar support portion (FSB) may be formed along a left edge portion and a right edge portion of the support portion (FS) to correspond to either one of the electrodes 10 that are disposed at left and right edge portions along a width direction of the battery cell (B). The frames (F) may be arranged in the direction (Z1 direction) in a laterally reversed pattern that reverses between left and right (a staggered pattern) such that frames (F) each having the bus bar support portion (FSB) on a left edge portion and frames (F) each having the bus bar support portion (FSB) on a right edge portion are alternately arranged in the direction (Z1 direction).

The substrate support portion (FSC) may have a relatively large width such as to stably mount and support the wiring substrate (C) thereon. The wiring substrate (C) may be mounted over the substrate support portions (FSC) of the frames (F), wherein the substrate support portions (FSC) of the frames (F) may be connected to one another in a direction (Z1 direction), forming a support surface extending along the direction (Z1 direction) to provide a support base for supporting the entire wiring substrate (C). That is, the substrate support portion (FSC) of each frame (F) may support the wiring substrate (C), wherein the substrate support portions (FSC) of the frames (F) may be connected to one another along a direction (Z1 direction) to form the support surface extending along the direction (Z1 direction), providing a stable support base for the entire wiring substrate (C).

The bus bars 15, which are for electrical connection of adjacent battery cells (B), may connect the adjacent battery cells (B) in a series or parallel manner or in a combination of series and parallel manners. The bus bars 15 may electrically connect the adjacent battery cells (B) by electrically binding the electrodes 10 of the adjacent battery cells (B). The bus bars 15 may connect the adjacent battery cells (B) in a parallel manner by connecting the same polarities of the electrodes 10 of the adjacent battery cells (B) or in a series manner by connecting the opposite polarities of the electrodes 10 of the adjacent battery cells (B).

The bus bars 15 may be placed to face the electrodes 10 on the upper surfaces of the battery cells (B) and may connect the electrodes 10 of the adjacent battery cells (B). In an embodiment, the opposite end portions of each bus bar 15 with respect to the bent portion 15a formed at the center of the bus bar 15 may be placed facing the electrodes of the adjacent battery cells (B) and connected thereto. The plurality of bus bars 15 may respectively connect the electrodes 10 of pairs of adjacent battery cells (B).

The substrate support portion (FSC) may be formed at a center of the support portion (FS) between the bus bar support portions (FSB) in the left and right edge portions. The wiring substrate (C) may be mounted on the substrate support portion (FSC). The wiring substrate (C) may include a plurality of conductive patterns (not shown) for collecting status information of the battery cells (B) and transmitting the collected status information to a battery management unit (not shown). The wiring substrate (C) may be electrically connected to a plurality of battery cells (B). For example, the wiring substrate (C) may be connected to the bus bars 15, which electrically connect the adjacent battery cells (B), in order to obtain voltage information of the battery cells (B). In some embodiments, although not shown, the wiring substrate (C) may be connected to thermisters (not shown) located at the upper surfaces of the battery cells (B) to obtain temperature information of the battery cells (B).

The wiring substrate (C) may transmit the status information obtained from the plurality of battery cells (B), such as, for example, voltage and temperature information of the battery cells (B), to a battery management unit (not shown), and the battery management unit (not shown) may control charging and discharging operations of the battery cells (B) based on the status information. In some embodiments, the wiring substrate (C) may control the charging and discharging operations of the battery cells (B) based on the status information together with the battery management unit (not shown).

Referring to FIG. 3, a flexible sensing portion (S) that may mediate transfer of a signal of the status information of the battery cells (B) may be connected to the wiring substrate (C). In an embodiment, the sensing portion (S) may be provided in the form of a flexibly deformable film. In an embodiment, although not illustrated, the sensing portion (S) may include an insulating film (not shown) and a conductive wire (not shown) provided on the insulating film. For example, the conductive wire may be formed as a copper foil pattern. The insulating film may be arranged to bury the conductive wire to insulate an electrical signal transmitted through the conductive wire from the outside.

The sensing portion (S) may include an input port (SI) connected to a battery cell (B), an output port (SO) connected to the wiring substrate (C), and a connection portion (SC) that connects the input port (SI) and the output port (SO). For example, the input port (SI) may correspond to a site on the battery cell (B) to which the status information of the battery cell (B) is input. For example, the output port (SO) may correspond to a site from which the status information of the battery cell (B) is output to the wiring substrate (C).

The input port (SI) of the sensing portion (S) may be connected to a battery cell (B) side. In an embodiment, the input port (SI) of the sensing portion (S) may be connected to a bus bar 15 that may electrically connect the adjacent battery cells (B), and may receive a voltage signal of the battery cell (B) through the bus bar 15. In some embodiments, although not illustrated, the input port (SI) may be connected to a thermister (not shown) disposed on the upper surface of the battery cell (B) and may receive a temperature signal of the battery cell (B) from the thermister. In this sense, it may be meant that the input portion (SI) of the sensing portion (S) is connected to a signal input portion for acquiring status information of the battery cell (B). The signal input portion, which may be connected to the battery cell (B) in order to acquire status information, such as voltage or temperature of the battery cell (B), may be, for example, a bus bar 15 electrically connected to the battery cell (B) or a thermister (not shown) thermally connected to the battery cell (B). In an embodiment, the input port (SI) and the signal input portion (for example, the bus bar 15) on the battery cell (B) side may be bound together by welding. For example, after the input port (SI) is mounted on the bus bar 15, the input port (SI) may then be welded (e.g., ultrasonically welded) onto the bus bar 15, such as by pressing on an ultrasonic horn (not shown) to which ultrasonic vibrations are applied. In some embodiments, the input port (SI) and the signal input portion (for example, the bus bar 15) on the battery cell (B) side may be bound together by using, for example, a conductive adhesive (not shown).

The output port (SO) of the sensing portion (S) may be connected to a pad (not shown) of the wiring substrate (C). An electrical signal transmitted through the output port (SO) of the sensing portion (S) may be transmitted to a conductive pattern (not shown) on the wiring substrate (C) through the pad of the wiring substrate (C). The output port (SO) of the sensing portion (S) may be connected to the pad of the wiring substrate (C) by welding or soldering, or by using a conductive adhesive (not shown), for example.

In an embodiment, the connection portion (SC) for connecting the input port (SI) with the output port (SO) may be formed to have a serpentine shape including curved portions that overlap with each other. The battery pack according to one or more embodiments may include frames (F) disposed in the direction (Z1 direction) in which the battery cells (B) are arranged, wherein the frames (F) may be bound or coupled together facing each other with a battery cell (B) therebetween. The battery cell (B) may experience swelling in the direction (Z1 direction) during charging and discharging operations. The frames (F) at front and rear of the battery cell (B) which are coupled with the battery cell (B) interposed between the frames (F) in the direction (Z1 direction) may accommodate deformation due to swelling as the battery cell (B) is slid in the direction (Z1 direction).

As described above, as the battery cells (B) expand in the direction (Z1 direction) due to the swelling, the positions of the frames (F) may be shifted along the direction (Z1 direction), and the relative positions of the input port (SI) and the output port (SO) of each sensing portion (S), which are connected to the bus bar 15 and the wiring substrate (C), respectively, on the frames (F) may be extended in the direction (Z1 direction). Accordingly, the connection portion (SC) connecting the input port (SI) and the output port (SO) may be forced into a deformation state, such as to accommodate the extension in the direction (Z1 direction). In an embodiment, since the connection portion (SC) has a serpentine shape including curved portions which overlap with each other, the connection portion (SC) may be easily deformed to follow the extension of the relative positions of the input port (SI) and the output port (SO) due to the swelling and, thus, may relieve concentration of stress accumulated in the connection portion (SC).

Figure 4:
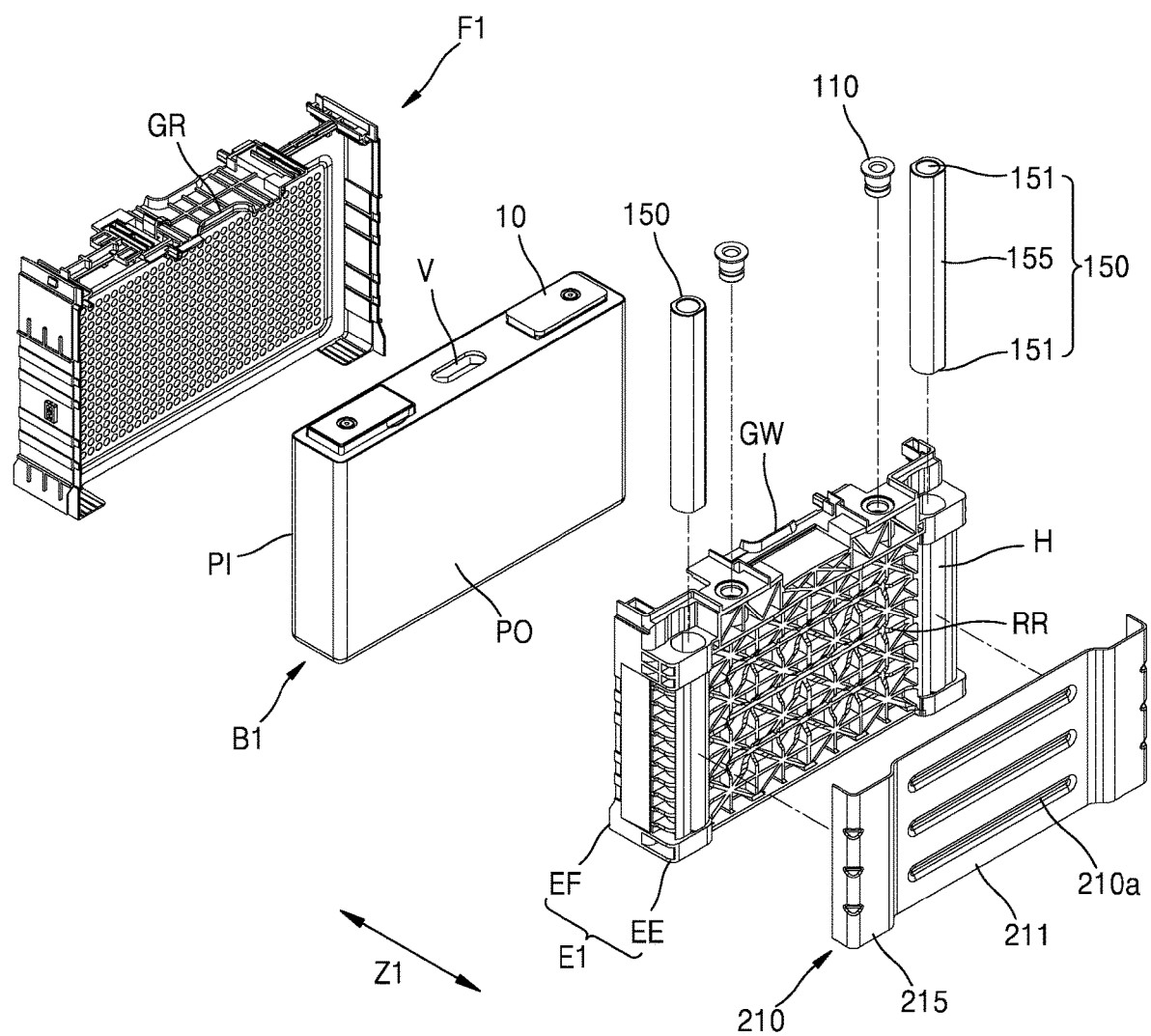
FIG. 4 is a partial exploded perspective view of the battery pack of FIG. 1.
Figure 5:
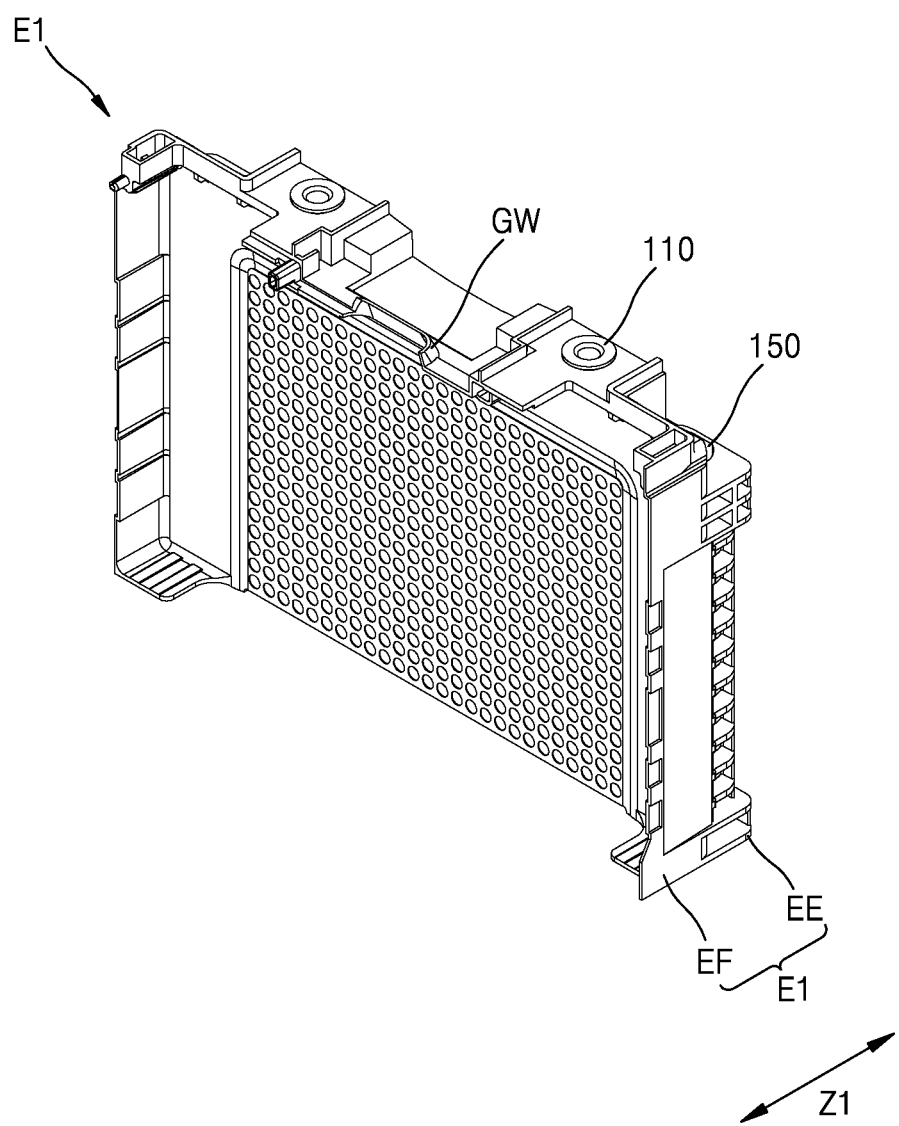
FIGS. 5 and 6 are perspective views showing a first end block of FIG. 4 from different directions.
Figure 6:
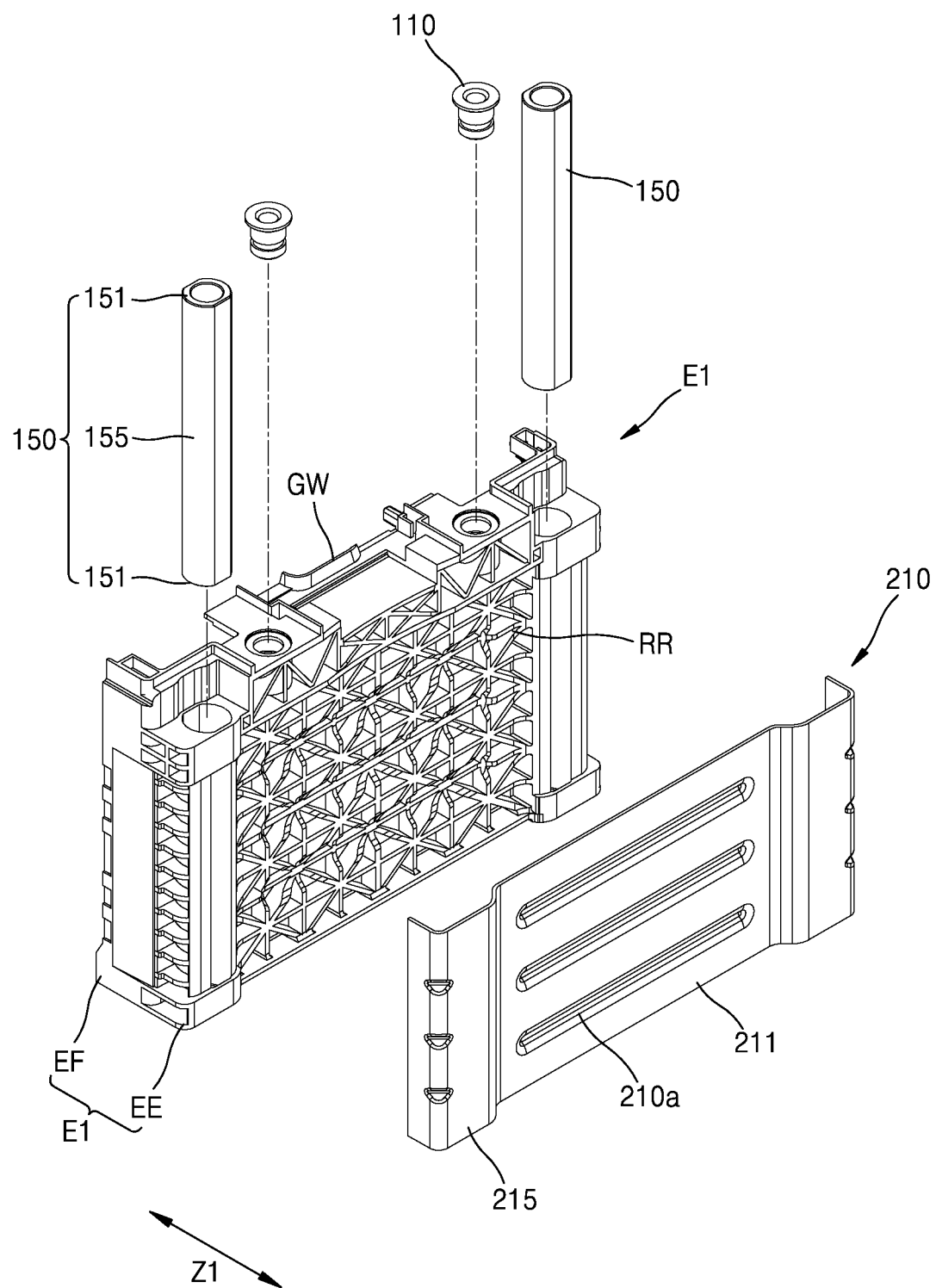

FIG. 4 is a partial exploded perspective view of the battery pack of FIG. 1; and FIGS. 5 and 6 are perspective views showing a first end block of FIG. 4 from different directions.

Referring to FIGS. 1 and 4, the battery pack according to one or more embodiments may include a first end plate 210 disposed on an outer side of a first battery cell (B1) arranged at the outermost side of the plurality of battery cells (B); and a first end block (E1) disposed between the first end plate 210 and the first battery cell (B1).

In particular, the battery cells (B) may be arranged along a direction (Z1 direction). The first end plate 210 may be disposed on the outer side of the first battery cell (B1) which is the outermost one of the battery cells (B) arranged along the direction (Z1 direction). The first end block (E1) may be interposed between the first battery cell (B1) and the first end plate 210. The first end block (E1) may surround an outer periphery of the first battery cell (B1) and may be coupled to a first frame (F1) with the first battery cell (B1) therebetween, thereby insulating and protecting the first battery cell (B1) from an external environment.

As used herein, the first frame (F1) may refer to an outermost frame of the plurality of frames (F) arranged alternately with the battery cells (B) in the direction (Z1) direction and coupled to each other. That is, the first frame (F1) may refer to a frame (F) arranged immediately inward from the first battery cell (B1) in the direction (Z1 direction). The frames (F) may be arranged alternately with the battery cells (B) in the direction (Z1 direction) and may insulate and protect the battery cells (B) from outside by surrounding front and rear sides of the individual battery cells (B). An inner side of the first battery cell (B1), which is the outermost one of the battery cells (B), may be surrounded by the first frame (F1) having a same structure as the other frames (F), while the first end block (E1) may be arranged on an outer side of the first battery cell (B1), due to the positional relation of the first battery cell (B1) arranged at the outermost side of the battery cells in the direction (Z1 direction). The first battery cell (B1) may be insulated and protected by being interposed between the first end block (E1) on the outer side and the first frame (F1) on the inner side. The first battery cell (B1) may be distinguished from the other battery cells (B) in terms of position, as being arranged at the outermost side in the direction (Z1 direction), but is not structurally distinguished from the others.

The first end block (E1) and the first frame (F1) may be coupled to each other in the direction (Z1 direction) with the first battery cell (B1) interposed therebetween. The first end block (E1) may partially surround the first battery cell (B1) in the direction (Z1 direction), while the first frame (F1) may surround the remaining part of the first battery cell (B1) in the direction (Z1 direction). The first end block (E1) and the first frame (F1) may partially surround the first battery cell (B1) by half and be coupled to each other to completely surround an outer periphery of the first battery cell (B1).

The first end block (E1) and the first frame (F1) may surround an outer surface (PO) and an inner surface (PI) of the first battery cell (B1), respectively, which are opposite main surfaces of the first battery cell (B1). For example, the first end block (E1) may surround the outer surface (PO) of the first battery cell (B1) and edge portions in contact with the outer surface (PO). The first frame (F1) may surround the inner surface (PI) of the first battery cell (B1) and edge portions in contact with the inner surface (PI). Here, the main surfaces of the first battery cell (B1) may mean the surfaces of the first battery cells (B1) occupying the largest area among the outer surfaces constituting the appearance of the first battery cell (B1).

The first end block (E1) and the first frame (F1) may be formed of insulating materials. For example, the first end block (E1) and the first frame (F1) may be formed of a plastic material, such as, for example, the same plastic material. In an embodiment, for insulation and protection of the first battery cell (B1), the first end block (E1) and the first frame (F1) may be formed of an insulating, highly rigid plastic material. In an embodiment, the first end block (E1) may include a plurality of reinforcing ribs (RR) to reinforce rigidity while reducing the weight of the entire battery pack using a lightweight material, such as plastic. For example, the reinforcing ribs (RR) may be formed in an end portion (EE) on the outer side of the first end block (E1).

The first end block (E1) may include a frame portion (EF) on an inner side facing the first battery cell (B1), and the end portion (EE) on the outer side which is a side opposite to that of the first battery cell (B1). The frame portion (EF), which may be coupled to the first frame (F1) with the first battery cell (B1) interposed therebetween, may be formed to surround the outer periphery of the first battery cell (B1). For example, on an upper side of the frame portion (EF) formed such as to cover an upper surface of the first battery cell (B1), a guide wall (GW) may be formed at a position corresponding to a cell vent (V) on the upper surface of the first battery cell (B1). The guide wall (GW) formed in the frame portion (EF) may surround and define an exhaust hole at the position corresponding to the cell vent (V) of the first battery cell (B1), and may guide an exhaust gas discharged through the cell vent (V).

In the first frame (F1), which may be coupled to the frame portion (EF) with the first battery cell (B1) interposed therebetween, a guide rib (GR) may be formed at a position corresponding to the cell vent (V) of the first battery cell (B1). The guide rib (GR) formed in the first frame (F1) may surround and define an exhaust hole at a position corresponding to the cell vent (V) of the first battery cell (B1), and may guide an exhaust gas discharged through the cell vent (V).

The frame portion (EF) and the first frame (F1) may be coupled to each other in the direction (Z1 direction) such as to surround the first battery cell (B1) to provide an exhaust path completely surrounding the cell vent (V) of the first battery cell (B1). The frame portion (EF) and the first frame (F1) may include the guide wall (GW) and the guide rib (GR), respectively, formed to surround the cell vent (V) on the upper surface of the first battery cell (B1), wherein the guide wall (GW) and the guide rib (GR) may provide the exhaust path completely surrounding the cell vent (V) by being coupled to each other, and the exhaust hole at the position corresponding to the cell vent (V), the exhaust hole surrounded by the guide wall (GW) and the guide rib (GR) coupled to each other. That is, the guide wall (GW) of the frame portion (EF) and the guide rib (GR) of the first frame (F1) may each be formed with a side open and may provide the exhaust path completely surrounding the cell vent (V) of the first battery cell (B1) as they are coupled to each other. When the cell vent (V) of the first battery cell (B1) is operated, an exhaust gas discharged from the cell vent (V) may be discharged upwardly in accordance with the guidance of the guide wall (GW) and the guide rib (GR) defining the exhaust hole above the cell vent (V). Similar to the first frame (F1), the other inner frames (F), not only the first frame (F1), may be formed such as to surround a corresponding cell vent (V), and may each include a guide rib (GR) with a side open. As the guide ribs (GR) of two adjacent frames (F) among the frames (F) on the front and rear sides are coupled together, exhaust paths completely surrounding corresponding cell vents (V), respectively, may be provided. Similar to the first frame (F1), the guide ribs (GR) formed in the other frames (F) may define exhaust holes at the positions corresponding to the corresponding cell vents (V).

The first end block (E1) may include the end portion (EE) on the outer side that is an opposite side to that of the frame portion (EF). The end portion (EE) may include an output port seat 110 to which an output terminal (not shown) of the battery pack may be coupled, and a bushing member 150 coupled to the first end plate 210. For example, the end portion (EE) as a part of the first end block (E1) may be formed of an insulating material along with the first end block (E1), wherein the output port seat 110 and the bushing member 150 formed of a conductive material may be coupled in the end portion (EE). For example, the end portion (EE) may surround the output port seat 110 and the bushing member 150 to fix the positions of the output port seat 110 and the bushing member 150. In an embodiment, as is described below, the end portion (EE), the output port seat 110, and the bushing member 150, which are formed of different materials, may be formed at the same time by insert injection molding. The output port seat 110 and the bushing member 150 may be fixed by being surrounded by the end portion (EE) or the first end block (E1).

The output terminal (not shown) of the battery pack may be coupled to the output port seat 110. Together with the output terminal (not shown) of the battery pack, a connection member (not shown) electrically connected to the battery cell (B) or the first battery cell (B1) may make a conductive connection with the output port seat 110. The output terminal (not shown) of the battery pack may include a pair of output terminals (not shown) having opposite polarities so as to constitute opposite ends of charge and discharge paths of the battery pack. The output port seat 110 may be formed as a pair to correspond to a pair of output terminals (not shown).

The bushing member 150 may be formed as a pair on opposite edges or sides of the end portion (EE). For example, the bushing member 150 may be provided as a pair at the outer sides of the output port seat 110. The bushing members 150 may extend parallel to each other along the opposite edges of the end portion (EE). In an embodiment, the bushing members 150 may be formed as hollow cylindrical members for fitting fastening members (not shown) thereinto. In an embodiment, the bushing members 150 may be formed in hollow cylindrical form such that the fastening members may be inserted therethrough. The bushing members 150 may provide fastening positions for the fastening members. For example, the bushing members 150 may provide fastening positions for fixing the battery pack. The fastening members inserted through the bushing members 150 may be coupled to a mounting frame (not shown) of the battery pack, thereby fixing the battery pack.

The output port seat 110 and the bushing member 150 of the end portion (EE) may be formed of a conductive material, such as, for example, a metal material. To avoid electrical interference between the output port seat 110 (or the output terminal coupled to the output port seat 110) and the bushing member 150, the output port seat 110 and the bushing member 150 may be formed at positions spaced apart from each other. For example, the output port seat 110 may be formed at a relatively inner position and the bushing member 150 may be formed at a relatively outer position. In an embodiment, the output port seat 110 and the bushing member 150 may have different heights. That is, the output port seat 110 and the bushing member 150 may have different heights along a lengthwise direction of the bushing member 150. For example, the output port seat 110 may be formed at a relatively high position, and the bushing member 150 may be formed at a relatively low position. In an embodiment, an uppermost portion of the bushing member 150 may be disposed below an uppermost portion of the output port seat 110 along the lengthwise direction of the bushing member 150.

A portion of the bushing member 150 may be surrounded by the end portion (EE) (or the first end block E1), while another portion of the bushing member 150 is exposed to the outside of the end portion (EE) (or outside of the first end block E1). That is, the bushing member 150 may include fixing portions 151 surrounded by the inside of the end portion (EE) (or in the first end block E1), and an exposed portion 155 exposed from the end portion (EE) (or the first end block E1). For example, the bushing member 150 may include the fixing portions 151 at opposite ends along the lengthwise direction, and the exposed portion 155 between the fixing portions 151 at the opposite ends.

The end portion (EE) may stably fix the position of the bushing member 150 through the fixing portions 151. In an embodiment, the end portion (EE) may be connected by welding to the first end plate 121 through the exposed portion 155. The exposed portion 155 may be exposed from the end portion (EE) through a welding hole (H) of the end portion (EE). The exposed portion 155 may be brought into contact overlapped with the first end plate 210 and serve as a welding site between the first end block (E1) and the first end plate 210, which may be welded by laser welding, for example. The bushing member 155 may be formed of a metal material, such as, for example, a same metal material forming the first end plate 210. In some embodiments, the bushing member 150 may be formed of steel.

In an embodiment, the bushing member 150 may be integrally formed with the first end block (E1). In an embodiment, for example, the bushing member 150 may be formed together with the first end block (E1) by insert injection molding. The bushing member 150 and the first end block (E1) may be formed of different materials. In an embodiment, the bushing member 150 and the first end block (E1) may be integrally formed by insert injection molding with different materials. In an embodiment, the bushing member 150 and the output port seat 110 may be integrally formed together with the first end block (E1) by insert injection molding. Here, the expression "integrally formed" may mean that the bushing member 150 and the output port seat 110 are not separated from each other unless they are physically damaged. The bushing member 150 and the output port seat 110 formed by insert injection molding to be surrounded by the first end block (E1) may not be separated from the first end block (E1) unless the bushing member 150, the output port seat 110, or the first end block (E1) is physically damaged. The expression that the bushing member 150 or the output port seat 110 is "surrounded" by the first end block (E1) may not mean merely that the bushing member 150 or the output port seat 110 is completely enclosed in the first end block (E1), encompassing that a portion of the bushing member 150 or the output port seat 110 is exposed from the first end block (E1). As described above, the bushing member 150 may be partially exposed with the exposed portion 155 from the first end block (E1), and the output port seat 110 may also be partially exposed from the first end block (E1) for coupling with an output terminal (not shown).

The first end plate 210 may be arranged outside the first end block (E1). In an embodiment, the first end plate 210 may be formed of a metal material, unlike the first end block (E1). The first end plate 210 may structurally bind a plurality of battery cells (B) constituting the battery pack according to one or more embodiments. In an embodiment, the first end plate 210 may be formed of a metal material that is structurally rigid and elastic. For example, the first end plate 210 may be formed of steel. The first end plate 210 may stably bind the plurality of battery cells (B) and provide an elastic restoring force to respond against swelling of the battery cells (B). The first end plate 210 may also suppress the swelling of the battery cells (B) and prevent or substantially prevent deterioration in electrical characteristics caused by shape deformation of the battery cells (B).

In an embodiment, the first end plate 210 may include a strength reinforcing portion 210a formed in an opening or recessed form. The strength reinforcing portion 210a may be embossed on a side of the first end plate 210 and engraved on the other side thereof.

In an embodiment, the first end plate 210 may include a base portion 211, and bent side portions 215 bent on both side edges of the base portion 211. The base portion 211 may provide a binding force to the battery cells (B) arranged along a direction (Z1 direction) at a position facing the battery cells (B). The bent side portions 215 may be formed on the opposite edges of the base portion 211 and may be coupled to the first end block (E1). The bent side portions 215 may be formed as a pair to surround both opposite edges of the first end block (E1) and may be coupled to the bushing members 150 formed on the opposite edges of the first end block (E1), respectively, such as by welding. The bushing members 150 may include the exposed portions 155 which are exposed from the first end block (E1) for welding to the first end plate 210. The bent side portions 215 of the first end plate 210 arranged on an outer side of the first end block (E1) may be arranged to surround the exposed portions 155 of the bushing members 150 at the opposite side edges of the first end block (E1) and coupled thereto by welding. For example, the bent side portions 215 of the first end plate 210 and the exposed portions 155 of the bushing members 150 may be coupled with each other by laser welding or any of a variety of welding methods, thereby forming welded portions.

Figure 7:
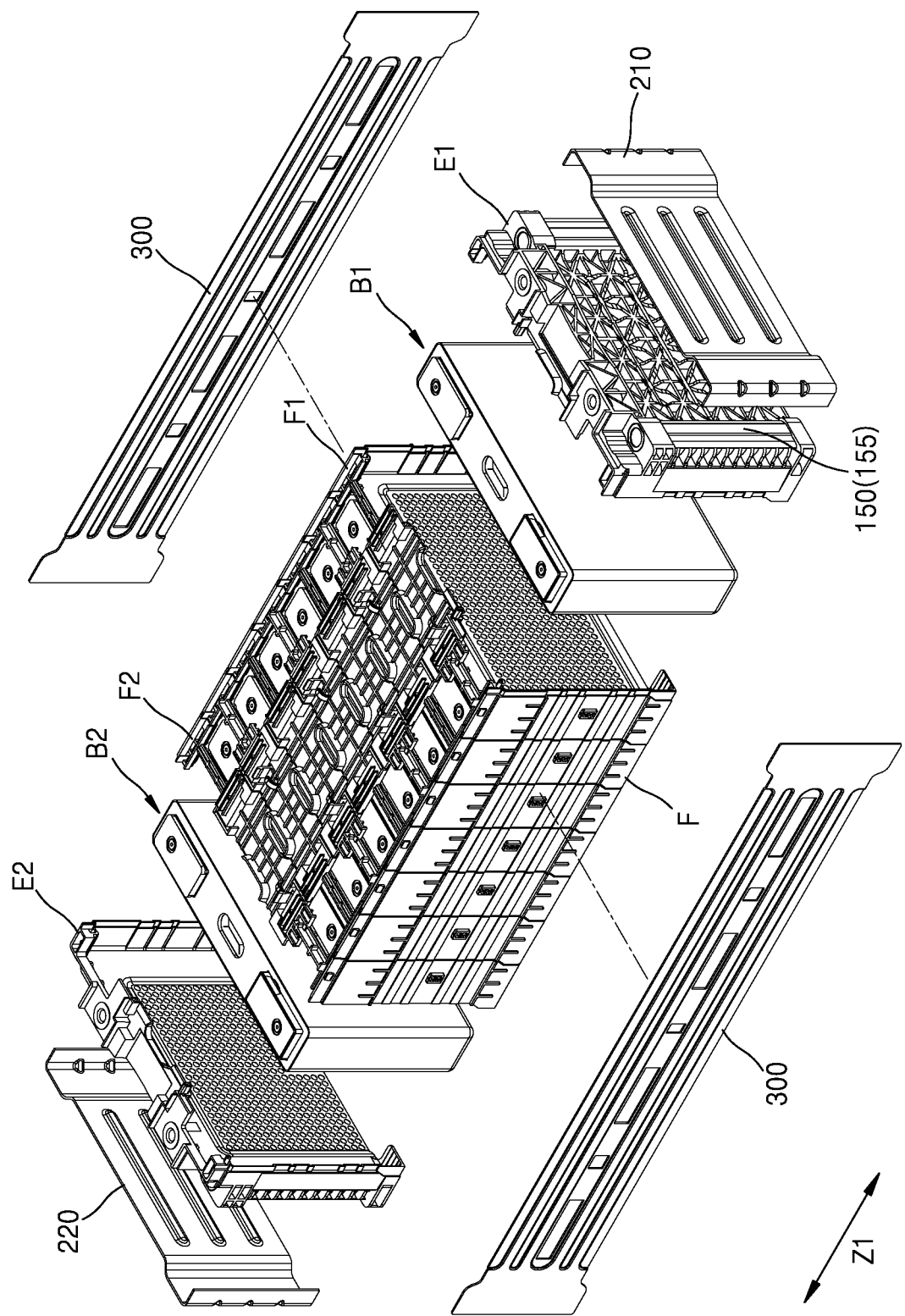
FIG. 7 is a partial exploded perspective view of a battery pack according to an embodiment.

FIG. 7 is a partial exploded perspective view of a battery pack according to an embodiment.

In an embodiment, referring to FIG. 7, side plates 300 may be welded to the bushing members 150 together with the first end plates 210. For example, the first end plate 210 and the side plates 300 may be arranged overlapped on the bushing members 150 and then welded together thereto, such as by laser welding. In some embodiments, after the first end plate 210 is arranged to overlap with the bushing members 150 and then welded thereto (first welding), the side plates 300 may be arranged to overlap with the bushing members 150 and then welded thereto (second welding). In either case, the first end plate 210 and the side plates 300 may be overlapped and welded to each other on the bushing members 150.

The side plates 300 may extend along the circumference of the plurality of battery cells (B) together with the first end plate 210 to enclose and structurally bind the plurality of battery cells (B), thus suppressing swelling of the battery cells (B). For example, the first end plate 210 may be arranged on an outer side of the first battery cell (B1) along the direction (Z1 direction), while the side plates 300 may be arranged along side edges of the battery cells (B) in a direction intersecting the direction (Z1 direction). The side plates 300 and the first end plate 210 may be coupled to each other on the bushing members 150 to enclose the plurality of battery cells (B) along the circumference of the battery cells (B).

In an embodiment, the side plates 300 may be formed of a metal material, such as, for example, steel. For example, the bushing members 150, and the first end plate 210 and the side plates 300 welded to the bushing member 150 may be formed of the same metal material, such as, for example, steel.

According to one or more embodiments, a structure for insulating the first battery cell (B), a structure for binding the plurality of battery cells (B) to provide structural rigidity, and a structure for providing sites of welding onto the first end plate (E1) may be provided as an integrated part. Accordingly, the battery pack according to one or more embodiments may be manufactured at a lower cost, with a reduced number of parts, and through fewer assembly processes. In particular, the first end block (E1) may insulate and protect the first battery cell (B1) through the frame portion (EF) provided on an inner side thereof, and may provide sufficient rigidity for stably binding the plurality of battery cells (B) through the end portion (EE) on an outer side thereof. The first end block (E1) may provide welding sites onto the first end plate 210 by using the bushing members 150 integrally formed with the first end block (E1). According to one or more embodiments, the first end block (E1) integrally formed with the bushing members 150 may be provided as a unitary part having multiple functions as described above. Therefore, the battery pack according to one or more embodiments may use a reduced number of parts, and fewer assembly processes may be required for the battery pack. As a result, the manufacturing cost of the entire battery pack may be reduced.

Referring to FIG. 7, on a side end (also referred to as a "first side end") of the battery pack along a direction (Z1 direction), the first frame (F1) and the first end block (E1) may be coupled to each other with the first battery cell (B1) therebetween, and the first end block (E1) may be coupled to the first end plate 210 on an outer side of the first end block (E1). On the other side (also referred to as a "second side end") of the battery pack along the direction (Z1 direction), a second frame (F2) and a second end block (E2) may be coupled to each other with a second battery cell (B2) therebetween, and the second end block (E2) may be coupled to a second end plate 220 on an outer side of the second end block (E2). In an embodiment, the first end block (E1) and the first end plate 210 on the first side end, and the second end block (E2) and the second end plate 220 on the second side end may be symmetrical with respect to each other. The second end block (E2) and the second end plate 220 may be similar to the first end block (E1) and the first end plate 210 as described above, and, thus, detailed descriptions of the second end block (E2) and the second end plate 220 will be omitted to avoid redundancy.

As described above, according to one or more embodiments, in a battery pack including a plurality of battery cells, a structure for insulating the battery cells, a structure for binding the plurality of battery cells to provide rigidity, and a structure for providing sites of welding onto the end plates may be provided as an integrated part. Accordingly, the battery pack according to one or more embodiments may be provided at a lower cost, with a reduced number of parts, and through fewer assembly processes.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as set forth by the following claims.

What is claimed is:

1. A battery pack comprising:
a plurality of battery cells arranged along a first direction;
a first end plate on an outer side along the first direction of a first battery cell of the plurality of battery cells that is arranged at an outermost side of the plurality of battery cells along the first direction; and
a first end block between the first end plate and the first battery cell,
wherein the first end block comprises:
a frame portion on an inner side of the first end block and facing the first battery cell, the frame portion surrounding edge portions of the first battery cell; and
an end portion on an outer side which is a side opposite to that of the first battery cell, the end portion surrounding opposite ends of a bushing member and comprising a welding hole between the opposite ends, and
wherein the bushing member comprises:
fixing portions surrounded by the end portion in each of the first direction and a direction opposite the first direction, the fixing portions being at opposite ends of the bushing member along a lengthwise direction of the bushing member; and
an exposed portion exposed from the end portion through the welding hole and defining a welded portion with the first end plate, the exposed portion being at a central position between the opposite ends of the bushing member, and being exposed from the end portion and facing the first end plate.

2. The battery pack of claim 1, further comprising a plurality of frames that are coupled to and face each other with battery cells of the plurality of battery cells alternately arranged therebetween, wherein a first frame of the plurality of frames that is arranged at an outermost side of the plurality of frames is coupled to and faces the frame portion with the first battery cell therebetween.

3. The battery pack of claim 2, wherein the frame portion surrounds an outer surface among main surfaces of the first battery cell and edge portions of the first battery cell that contact the outer surface, and
the first frame surrounds an inner surface among the main surfaces of the first battery cell and edge portions of the first battery cell that contact the inner surface.

4. The battery pack of claim 2, wherein the first battery cell comprises a cell vent on an upper surface thereof,
the frame portion comprises a guide wall at a position corresponding to the cell vent, and
the first frame comprises a guide rib at a position corresponding to the cell vent.

5. The battery pack of claim 4, wherein when the frame portion and the first frame are coupled to each other with the first battery cell therebetween, the guide wall of the frame portion and the guide rib of the first frame are connected to each other to provide an exhaust path completely surrounding the cell vent of the first battery cell.

6. The battery pack of claim 1, wherein the first end block is integrally formed.

7. The battery pack of claim 1, wherein the first end block comprises a plastic material, and the bushing member comprises a metal material.

8. The battery pack of claim 1, wherein the bushing member is integrally formed together with the first end block by insert injection molding.

9. The battery pack of claim 1, wherein the bushing member comprises a pair of bushing members at opposite sides of the end portion.

10. The battery pack of claim 1, wherein the bushing member comprises a hollow cylindrical member configured to receive a fastening member thereinto.

11. The battery pack of claim 1, wherein the end portion comprises an output port seat configured to receive an output terminal of the battery pack thereinto.

12. The battery pack of claim 11, wherein the output port seat comprises a metal material.

13. The battery pack of claim 11, wherein the bushing member and the output port seat comprise a pair of bushing members and a pair of output port seats, respectively, and the pair of bushing members is located outside of the pair of output port seats.

14. The battery pack of claim 11, wherein the bushing member has a height different from a height of the output port seat along the lengthwise direction in which the bushing member extends.

15. The battery pack of claim 14, wherein an uppermost portion of the bushing member along the lengthwise direction is below an uppermost portion of the output port seat.

16. The battery pack of claim 1, wherein the end portion comprises a plurality of reinforcing ribs.

17. The battery pack of claim 1, wherein the first end plate comprises:
a base portion; and
bent side portions respectively on both side edges of the base portion, the bent side portions surrounding the bushing member and defining welded portions with the bushing member.

18. The battery pack of claim 1, wherein side plates are arranged along side edges of the battery cells in a direction intersecting the first direction in which the battery cells are arranged.

19. The battery pack of claim 18, wherein the side plates and the first end plate are welded to the bushing member.

* * * * *